UNITED STATES PATENT OFFICE.

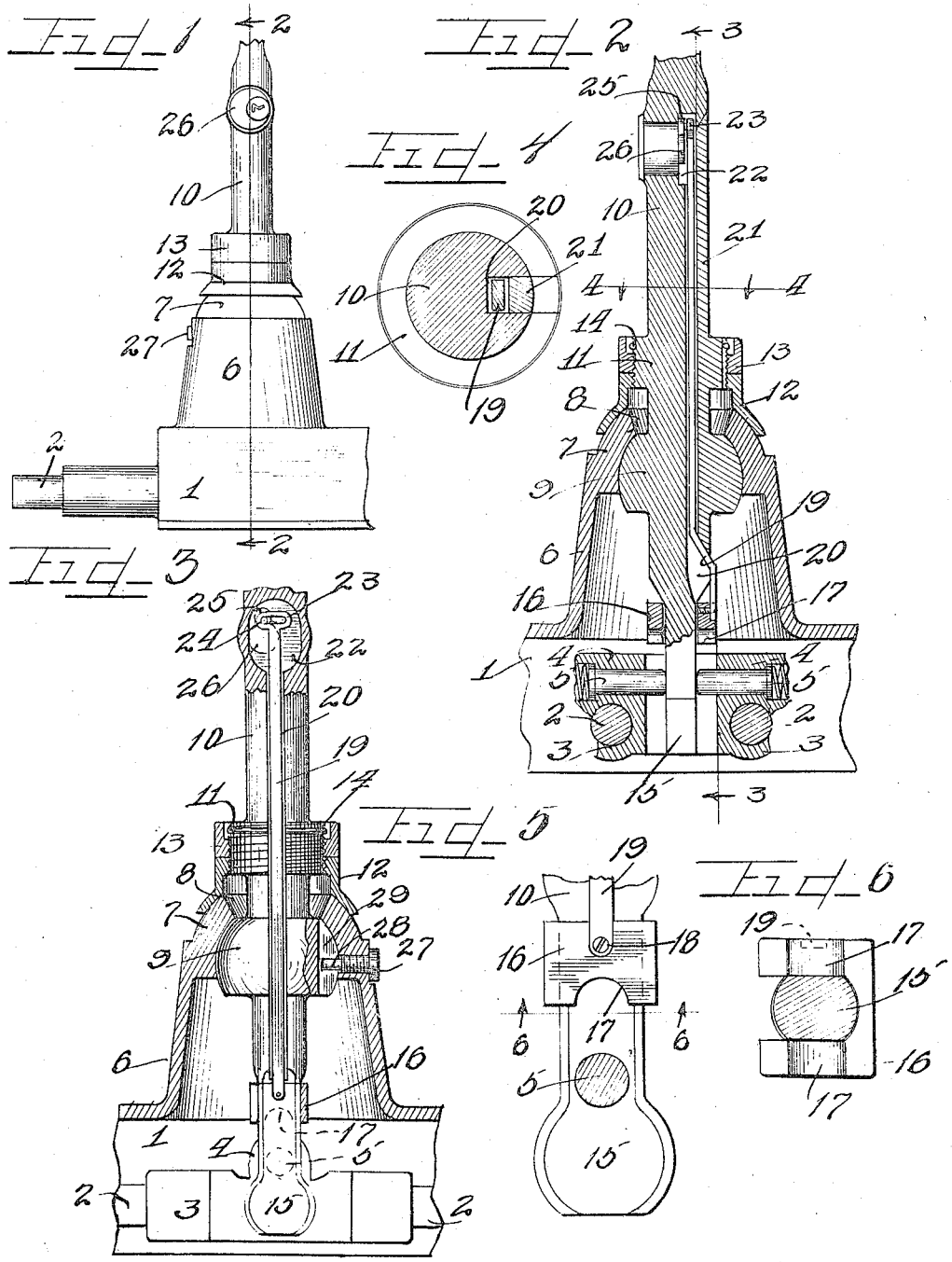

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT-LEVER LOCK.

REISSUED

1,299,954.  Specification of Letters Patent.  Patented Apr. 8, 1919.

Application filed February 3, 1917. Serial No. 146,336.

*To all whom it may concern:*

Be it known that I, COLVIN L. JOHNSON, a citizen of the United States, and a resident of the city of Chicago, in the county of Cook and State of Illinois, have invented certain new and useful Improvements in Gear-Shift-Lever Locks; and I do hereby declare that the following is a full, clear, and exact description of the same, reference being had to the accompanying drawings, and to the numerals of reference marked thereon, which form a part of this specification.

This invention relates to an improved form of a gear shift lever lock, wherein the locking mechanisms are mounted in the interior of the gear shift lever and upon the lower inclosed end of the lever and operate to lock the lever in engagement with spring controlled pins movably secured within a block connecting the gear shift rods to lock the gear shift lever and prevent tampering with the locking mechanisms by unauthorized persons.

It is an object of this invention to construct a gear shift lever for automobiles having a locking mechanism therein adapted to engage pins movably secured within blocks associated with the gear shift rods to lock the lever from movement.

It is also an object of this invention to provide a locking mechanism for a gear shift lever wherein a locking block slidably mounted on the lower end of the lever is adapted to be actuated to engage over locking pins associated with the gear shift rods.

It is an important object of this invention to construct an inclosed gear shift lever locking mechanism adapted to be actuated by a key to engage locking pins mounted in locking blocks associated with the gear shift rods to prevent movement of the lever.

It is furthermore an object of this invention to provide an inclosed key-operated lock for a gear shift lever of a motor car wherein the gear shift lever is locked from movement in a neutral position by the engagement of a part of the lock with locking pins movably secured in blocks connected with the gear shift rods.

It is also an object of this invention to construct an inclosed gear shift lever locking device for motor cars to lock or unlock the lever in neutral position only by the use of a key for the purpose.

Other and further important objects of the invention will be apparent from the disclosure in the drawings and specification.

The invention (in a preferred form) is illustrated in the drawings and hereinafter more fully described.

In the drawings:

Figure 1 is an elevational view partly broken away showing a gear set and shift lever equipped with a lock embodying the principles of my invention.

Fig. 2 is a detail section taken on line 2—2, of Fig. 1, with parts shown in elevation, and with parts broken away.

Fig. 3 is a vertical section taken on line 3—3 of Fig. 2, with parts shown in elevation.

Fig. 4 is a horizontal section taken on line 4—4 of Fig. 2.

Fig. 5 is an enlarged elevational view of one side of the lower end of the gear shift lever, and showing one of the locking pins in section.

Fig. 6 is a section taken on line 6—6 of Fig. 5.

As shown in the drawings:

The reference numeral 1, represents a housing mounted upon the top of a transmission gear shift case (not shown) and projecting longitudinally through said housing, are slidable gear shift rods 2, spaced a short distance from one another and each pair having rigidly secured centrally thereon within the housing 1, a block 3, on the upper central edge of which is integrally formed an upwardly directed ear or projection 4, for movably mounting a spring controlled locking pin 5, in horizontal position at right angles to the gear shift rods 2, and with its inner end projecting into the space afforded between the blocks 3, as clearly shown in Fig. 2. Formed integrally upon the top of the housing 1, and projecting upwardly therefrom, is a hollow globular or socket receptacle casing 6, the outer upper portion of which is dome-shaped as designated by the reference numeral 7, and is provided with a central aperture or opening 8, which communicates with a socket, or ball shaped, receptacle within the dome 7, for movably receiving seated therein the ball portion 9, of a gear shift lever 10, projecting upwardly through said opening 8, and upon which is integrally formed a short distance above the ball portion 9, an outwardly threaded enlarged circular flange 11.

To hold the ball portion 9, seated within the dome 7, a bell shaped ring 12, is threaded onto the flange 11, for a distance sufficient to permit the lower or bell shaped portion of the ring 12, to movably fit over the upper part of the dome 7, with the lower edge or rim of the ring disposed a short distance above the lower portion of the dome to permit a universal movement of the ring 12, over the dome 7, when the lever 10, is actuated. To lock the ring 12, in position, a collar 13, and a washer 14, are threaded upon the upper end of the flange 11, with the collar 13, seated upon the upper portion of the ring 12.

Integrally formed on the lower end of the lever 10, a short distance below the ball portion 9, is a flat tail piece 15, which extends downwardly into the housing 1, and, for neutral position of the lever, lies between the inner ends of the locking pins 5, as shown in Fig. 2. Slidably mounted upon the tail 15, is a locking block 16, having a semi-circular notch 17, formed at the lower end of each of two opposite sides thereof adapted to fit over or seat upon the pins 5, to lock the tail 15, and the entire gear shift lever 10, from movement when the locking block 16, is in its lowermost position between the ears 4, of the blocks 3. Recessed into one side of the locking block 16, and secured thereto by means of a screw 18, or other suitable means is a long upwardly extending locking or latch bar 19, bent inwardly to fit within a long passage 20, formed longitudinally within the lever 10.

As clearly shown in Fig. 2, the passage 20, which opens through one side of the lever 10, is closed by means of a suitably shaped retaining bar 21, which is disposed in the outer part of the passage 20, and is secured to the lever 10, by any suitable means to inclose the latch bar 19, the lower end of which, however, is permitted to project out of the lever through a portion of the passage 20, left open for the purpose to permit the latch bar 19, to be engaged to the locking block 16.

Formed in the upper end of the gear shift lever 10, is a chamber 22, communicating with the upper end of the passage 20, and into which projects the upper end of the latch bar 19, which has integrally formed thereon a slotted head 23, to co-act with a pin 24, formed on a rounded projection 25, on the barrel 26, of a pin lock, mounted within the chamber 22.

The operation is as follows:

In the neutral position of the gear shift lever 10, the tail piece 15, projects downward between the inner ends of the locking pins 5.

In order to shift the gears a composite movement of the gear shift lever 10, is necessary, that is, the lever must be thrown to one side and either forwardly or rearwardly for the purpose, the tail piece 15, contacting the end of one of the pins 5, forcing the same against the action of its controlling spring, to permit the lever to move in the space provided between the blocks 3, to shift the gears. To prevent rotation of the gear shift lever 10, within the casing 6, a retaining screw 27, is threaded through the wall of said casing, so that its inner pin end 28, which is of reduced diameter projects into a slot 29, cut vertically in one side of the ball portion 9, as clearly shown in Fig. 3.

In the unlocked position of the lever 10, the rounded projection 25, of the lock barrel 26, is directed upwardly with the pin 24, at one end of the slot in the latch bar head 23, thus holding the latch bar 19, elevated with the locking block 16, in release position. To lock the lever 10, from movement it is first moved to neutral position, and by means of a key inserted in the Yale type of lock, the barrel 26, is rotated, with the pin 24, sliding to the other end of the slotted head 23, thus forcing the latch bar 19, downwardly and moving the locking block 16, on the tail piece 15, between the ears 4, of the blocks 3, to its lowermost position wherein the notches 17, engage around the locking pins 5, to hold the lever locked against movement, thus preventing theft of an automobile, equipped with such a lock, or interference with the gear shift mechanisms thereof.

To unlock the device it is only necessary to insert the key in the lock, and by turning the barrel 26, in an opposite direction the latch bar 19, is drawn upwardly, thus moving the locking block 16, out of engagement with the locking pins 5, into release position, as shown in Figs. 2 and 3.

I am aware that various details of construction may be varied through a wide range without departing from the principles of this invention, and I therefore do not purpose limiting the patent granted otherwise than necessitated by the prior art.

I claim as my invention:

1. In a gear shift lever lock of the class described the combination with a gear shift lever, of locking means therein, a notched locking block actuatable thereby, and locking pins adapted to be engaged by said notched locking block to hold the gear shift lever locked from movement.

2. In a device of the class described the combination with a gear shift lever, of locking means therein, a locking block slidable on said lever connected to said locking means, and pins connected with the gear shift mechanism of an automobile adapted to be engaged by said locking block to lock the gear shift lever from movement.

3. In a device of the class described the combination with a gear shift lever, of a notched locking block slidable thereon, locking pins mounted therebelow disposed on opposite sides of said gear shift lever, and key-operated means within said gear shift lever connected with said locking block to move the same downwardly into a position with said notches engaging around said pins to hold the lever locked from movement.

4. In a device of the class described the combination with the gear shift rods of an automobile, of blocks mounted thereon, locking pins movably connected with said blocks, a gear shift lever projecting downwardly between said blocks and in neutral position disposed between adjacent ends of said pins, a notched locking member slidable on said lever, and key-operated means within said lever connected with said locking member to move the same downwardly between said blocks into a position to seat upon said pins to hold the lever in neutral position locked against movement.

5. In a device of the class described adapted for use on an automobile the combination with a ball and socket gear shift lever, of locking means slidably mounted on the lower end thereof, key-operated mechanisms within said lever connected to actuate said locking means, and locking pins on the gear shift rods of the automobile adapted to be engaged by said locking means when actuated by said mechanisms to hold said lever locked in neutral position.

6. The combination with a passaged gear shift lever, locking means within said passage, notched means slidable on said lever connected to said locking means, and members disposed on opposite sides of said lever below said notched means adapted to fit into said notched means when the same is moved downwardly by said locking means to hold the lever locked against movement.

7. In a device of the class described, pins movably mounted on the gear shift rods of an automobile, a gear shift lever having its lower end disposed between adjacent ends of said pins in neutral position, and inclosed locking means associated with said lever adapted to engage said pins to hold the lever locked from movement in neutral position.

8. In a gear shift lever lock of the class described, means movably mounted on the gear shift rods of an automobile, a gear shift lever, and a mechanism thereon adapted to engage said means to hold said lever locked against movement.

9. In a gear shift lever lock, means mounted on the gear shift rods of an automobile, a gear shift lever, locking means associated therewith, and mechanisms connected with said lever to move said locking means into engagement with said gear shift means to lock said lever from movement.

In testimony whereof I have hereunto subscribed my name in the presence of two subscribing witnesses.

COLVIN L. JOHNSON.

Witnesses:
   CHARLES W. HILLS, Jr.,
   EARL M. HARDINE.